Feb. 16, 1932.   J. A. SPENCER   1,845,997
TEMPERATURE CONTROLLED APPARATUS
Filed June 1, 1922    2 Sheets-Sheet 1
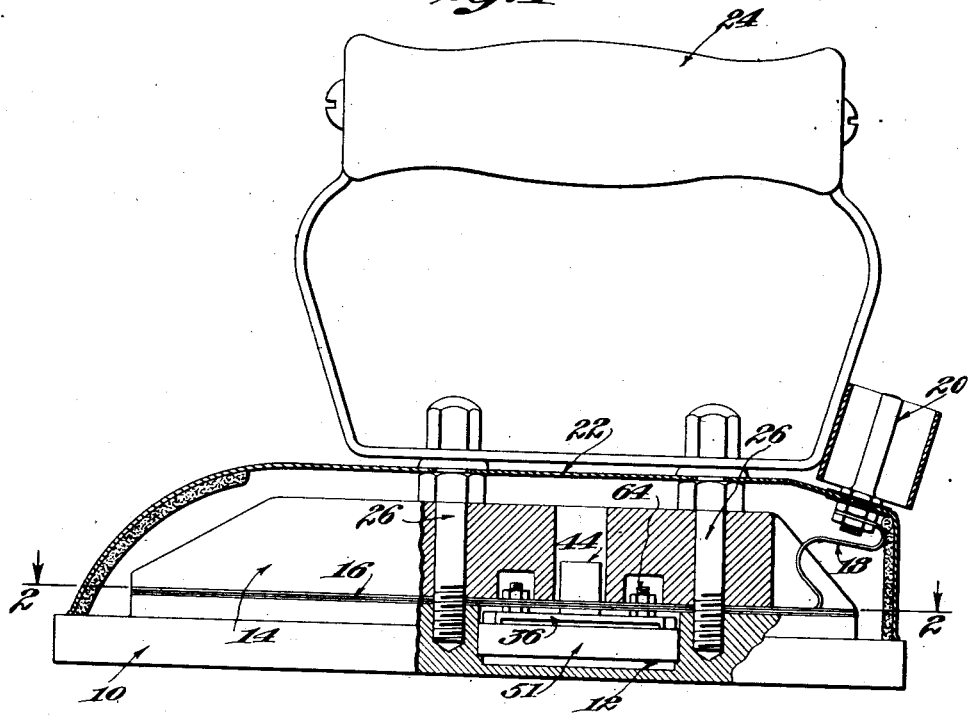
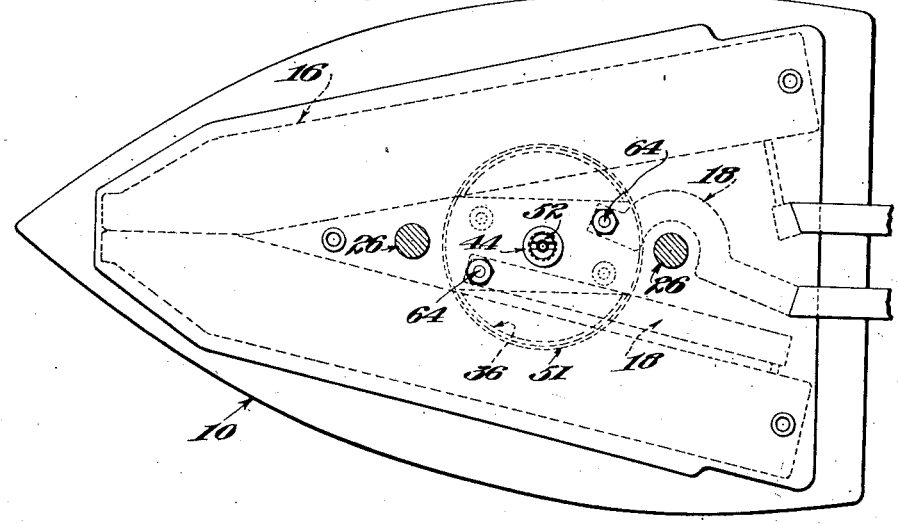

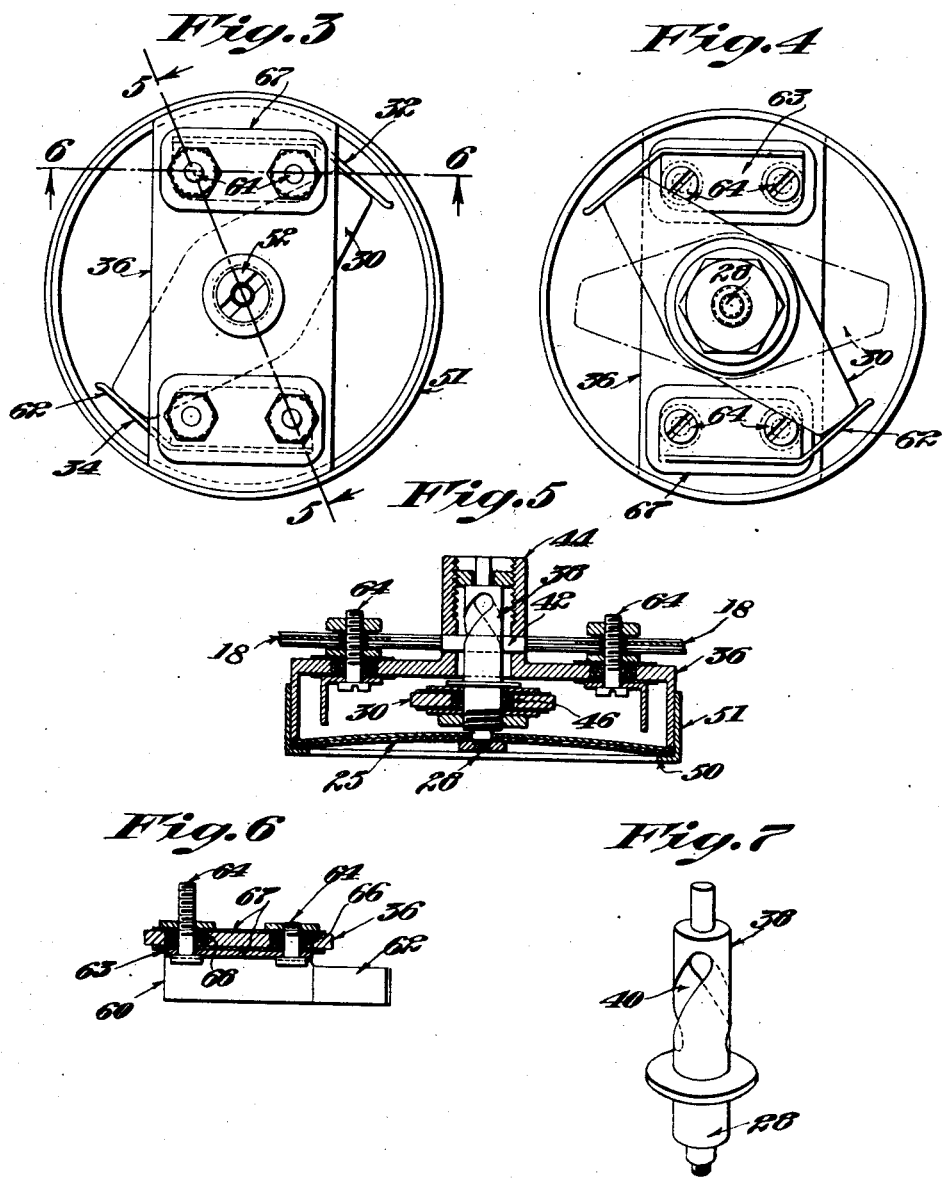

Patented Feb. 16, 1932

1,845,997

UNITED STATES PATENT OFFICE

JOHN A. SPENCER, OF REVERE, MASSACHUSETTS, ASSIGNOR TO SPENCER THERMOSTAT COMPANY, OF CAMBRIDGE, MASSACHUSETTS, A CORPORATION OF MASSACHUSETTS

TEMPERATURE CONTROLLED APPARATUS

Application filed June 1, 1922. Serial No. 565,256.

The present invention relates to temperature controlled apparatus and more particularly to apparatus of this character designed for operating valves, switches and similar appurtenances when predetermined temperature limits are reached.

My Patent No. 1,448,240, granted March 13, 1923, discloses a thermostatic apparatus adapted to control the flow of heating current in a sadiron or similar construction. This apparatus is so designed that the circuit through which the heating current flows is instantly broken when the sadiron reaches certain predetermined upper critical temperatures and is automatically closed when the temperature of the sadiron is lowered to a predetermined critical point.

The object of the present invention is to increase the efficiency of and otherwise improve thermostatic apparatus of this general character, making it particularly useful for controlling electric circuits as well as valves and switches of various types.

With this object in view the several features of the invention consist in certain novel features of construction, combinations and arrangements of parts hereinafter described and claimed, the advantages of which will be obvious to those skilled in the art from the following description.

In the accompanying drawings illustrating a preferred form of the invention Fig. 1 represents a sectional elevation of the improved apparatus embodied in a sadiron; Fig. 2 is a plan of apparatus shown in Fig. 1; Figs. 3-5 are details illustrating the thermostatic apparatus removed from the sadiron and shown separately; Fig. 6 is a detail illustrating a stationary contact; and Fig. 7 is a view of a worm.

As will be obvious to those skilled in the art it is quite important that apparatus of this general character when embodied in units such as sadirons, electric heaters, etc. and employed for automatically opening the heating circuit shall be capable of successful operation on circuits employing both direct and alternating currents. According to the present invention, the heating circuit is opened at a plurality of points with great rapidity upon reaching certain predetermined critical temperatures and in such a manner that arcing at the contact points is avoided, independently of whether the heating circuit employs direct or alternating current. This is accomplished essentially by employing in conjunction with a thermostatically controlled member a remote means, such as a movable contact member which has a rate of movement much higher than that of the thermostatically controlled member through the provision of new and improved connecting mechanism. When it is understood that the thermostatic member employed suddenly changes shape upon reaching certain predetermined critical temperatures with great rapidity and that the rate of movement of the contact member itself is even greater than that of the thermostatic member, it will be evident that the rate of separation of the contacts is sufficiently rapid to prevent the formation of an arc upon opening the circuit. Upon referring to the illustrated embodiment of the invention, it will be observed that the sadiron in which the thermostatic apparatus is embodied has a base member 10 provided with a recessed portion 12 in which the control apparatus is located. The base member is surmounted by a metallic block 14 with a heating element 16 of usual form interposed between the block and base member. The opposite sides of the heating element are connected in the usual manner through leads 18 with a terminal plug 20 mounted upon the rear portion of a sheet metal shell 22. The upper portion of the shell is provided with a handle 24, the handle, shell and base member being connected together by bolts 26. When the temperature of the sadiron base reaches an approximately predetermined upper critical value, the thermostatic apparatus operates to open the heater circuit and cut off the flow of current through the heating unit 16. Thereafter when the temperature of the base drops to a certain lower critical value, the apparatus functions to close the circuit and cause a renewed flow of heating current. This automatic opening and closing of the circuit is simply and effectively accomplished in such a manner that no pitting or other injurious effect upon the contacts is evident after repeated operation of the apparatus for long periods of time. To this end a thermostatic disk 25 is located in the lower portion of the recess 12, this disk being connected at its central portion to a stud 28. Connected to the stud above the thermostatic disk is a contact arm 30, which, in one position, is adapted to engage at its opposite ends with stationary contacts 32 and 34 projecting downwardly from a cup-shaped support 36. The stationary contacts 32 and 34 are connected in the heating circuit in such a manner that the circuit is closed when the opposite ends of the cross-arm 30 contact with the stationary members and is opened when the ends of the arm move therefrom. The arm 30 thus comprises two contacts for effecting a series of simultaneous breaks in the circuit, the contacts being remotely controlled. The rotation of the contact arm 30 upon movement of the thermostatic disk is accomplished through the provision of a worm 38, which preferably comprises a hollow stud having a spiral slot 40 formed therein. The spiral slot is engaged by a stationary guide pin 42, which is fixedly retained at its opposite ends in an upstanding collar 44 formed upon the support 36. With this construction, it will be evident that upon flexing the disk 25 the worm 38, together with the contact arm 30, is rapidly rotated through engagement of the pin 42 with the slot 40. The rate of movement of the contact arm 30 will obviously depend upon the pitch of the slot 40 and the length of opposite ends of the arm. In order to prevent the flow of heating current through the worm and thermostatic disk, the contact arm 30 is preferably insulated from the stud 28, as indicated at 46. The thermostatic disk may be conveniently constructed in the manner indicated in the Spencer patent hereinbefore referred to, it being remembered that this construction is such that the disk resists any tendency to change shape, due to changes of temperature, until certain predetermined temperature limits are reached, when thereafter the disk suddenly reverses its curvature. The thermostatic element is thus characterized in having two (initial and final) positions of relatively stable equilibrium, and a number of successive intermediate positions of unstable equilibrium. Upon change of temperature in the opposite direction, a reverse action takes place. In the present construction, the thermostatic disk 25 is loosely held against movement at its edges through the formation of an overhanging shoulder portion 50, which may be produced by threading an annular ring 51 onto the cup-shaped casing support 36. With this construction, when the temperature of the disk reaches a point at which the disk is designed to change shape, a sudden reversal of curvature takes place. Owing to the fact that the edges of the disk are restrained from movement, this change of shape imparts a sudden and rapid movement to the central portion of the disk and the actuating worm, which in turn imparts a rapid rotary impulse to the contact arm 30, tending to open or close the heating circuit, according to the direction of movement of the disk.

It is possible to vary the temperature at which the thermostatic disk suddenly changes shape by initially varying the flexure or shape of the disk. This may be accomplished in the present invention by providing an adjusting plug 52, which is threaded in the tubular extension 44 and engages with the upper end of the worm 38. By varying the position of the adjusting plug 52, the longitudinal position of the worm and stud 28 may be accordingly varied to change the initial shape of the disk or thermostatic member 25. It will be evident to those skilled in the art that if the plug is adjusted to such a point that the thermostatic member is on the verge of suddenly changing shape the latter will operate upon less temperature change. On the other hand, as the mechanical pressure imposed upon the thermostatic member, tending to flatten it or cause it to change to a shape of opposite curvature, is relieved, a greater temperature change is required to cause the sudden reversal of curvature of the member. This adjustment is conveniently employed for accurately adjusting the upper critical temperature at which the thermostatic member operates to open the heating circuit. In a like manner, the height of the thermostatic member or disk above the bottom of the recess 12 is designed to independently control the closing of the circuit when the temperature of the sadiron has dropped to the desired lower critical point. Adjustment is made at the screw 64.

The stationary contact members 32 and 34 are conveniently connected to the supporting casing 36 in the manner shown particularly in Fig. 6. Upon an inspection of this figure it will be noted that each of the contact members consists of an angle plate 60 having an inclined contact portion 62 and an attaching flange 63. The attaching flange is connected to the support 36 by screws 64, which are insulated from the support by small mica washers 66 and mica sheets 67 located upon opposite sides of the support as indicated. One of the attaching screws 64 passes through the support and heater element above, as indicated in Fig. 5, and serves as a terminal for connection with the leads 18.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. Temperature controlled apparatus including a support, a post slidable in the support and having a spiral slot and a shoulder, means engaging the shoulder for longitudinally shifting the post and means on the support engaged in the slot for imparting a twisting movement to the post as it is longitudinally shifted.

2. Temperature controlled apparatus comprising a thermostatic sheet, a stem connected to the sheet and adapted to be moved in a lengthwise direction with deflection of the sheet, means for rapidly rotating the stem upon lengthwise movement thereof, a contact member adapted to be rotated by a rotation of the stem, and a stationary contact cooperating with the rotatable contact.

3. Temperature controlled apparatus comprising an arched thermostatic disk, means for confining the periphery of the disk leaving the central portion free to move under temperature changes, an operating member connected to the central portion and adapted to be moved in lengthwise direction thereby, said member having a spiral formed therein, means engaging with the spiral to cause rotation of the operating member upon lengthwise movement, and a contact arm connected with the operating member and adapted to be rotated thereby.

4. Temperature controlled apparatus comprising a thermostatic member, an operating stem connected to the thermostatic member and having a spiral formed therein, means engaging with the spiral for causing rotation of the stem upon lengthwise movement thereof, an operating arm connected to the stem and insulated therefrom, and stationary contacts adapted to engage with opposite ends of the operating arm.

5. Temperature controlled apparatus comprising an arched thermostatic disk, means for confining the periphery of the disk, means for varying the initial deflection of the disk, a switch comprising relatively stationary and movable elements and connections between said disk and switch for causing sudden relative movement between said elements by a movement of the disk when the temperature of the latter reaches a predetermined point.

6. Temperature controlled apparatus comprising an arched thermostatic disk, means for confining the periphery of the disk, an operating stem connected to the central portion of the disk and adapted to be moved lengthwise upon deflection of the disk, a stationary contact, a movable contact operated by the stem, and means engaging with the stem and adapted to vary the initial deflection of the disk.

7. A post for use in temperature controlled apparatus comprising a body portion having a spiral slot formed therein, said post having a plurality of shouldered portions, one of which is adapted to receive a switch member, and another to receive an actuating member for the post.

8. Temperature controlled apparatus including a support, a thermostatic disk having a portion secured in fixed relation to the support and a portion movable with respect to the support, a post supported by the disk for rotation relative to the support, and means for rotating the post on relative axial movement of the support and disk.

9. Temperature controlled apparatus including a support having an upstanding collar, a thermostatic disk carried by the support having a projection extending within the collar and adjustably mounted means in the collar engaging the projection to variably limit its movement in one direction, said projection having a spiral slot formed therein and means on the collar engaged in the slot for imparting a twisting movement to the projection when longitudinally shifted.

10. Temperature controlled apparatus comprising a thermostatic disc, means for confining the periphery of the disc leaving the central portion free to move under temperature changes, a post fixed to said central portion having a spiral slot formed therein, means engaging with the spiral slot to cause rotation of the post upon lengthwise movement, a contact arm secured to said post adapted to be rotated thereby, and stationary contacts adapted to engage with opposite ends of the operating arm.

11. Temperature controlled apparatus comprising a thermostatic member adapted to change shape upon variation in temperature, an operating member connected to move therewith, a movable contact attached to said operating member, a fixed contact cooperating therewith and means associated with said operating member adapted to move said movable contact in a plane to which the movement of the operating member is substantially perpendicular.

12. Temperature controlled apparatus comprising a thermostatic member adapted to change shape upon variation in temperature, an operating member connected to move therewith, a movable contact joined to said operating member, a fixed contact cooperating therewith, and means associated with said operating member adapted to move said movable contact in an arcuate path to which the movement of the operating member is substantially perpendicular.

13. Temperature controlled apparatus comprising a thermostatic member adapted to change shape upon variation in temperature, an operating member connected to move therewith, a movable contact joined to said operating member, a fixed contact cooperating therewith, and means associated with said operating member and movable contact for moving the latter in a plane to which the movement of the operating member is substantially perpendicular, and at a rate higher than the rate of movement of the thermostatic member.

14. Temperature controlled apparatus comprising a thermostatic member adapted to change shape upon variation in temperature, an operating member connected to move therewith, a movable contact attached to said operating member, a fixed contact cooperating therewith, and means associated with said operating member and movable contact for moving the latter in an arcuate path to which the movement of the operating member is substantially perpendicular, and at a rate higher than the rate of movement of the thermostatic member.

15. Temperature controlled apparatus comprising a thermostatic member adapted to change shape upon variation in temperature, relatively movable contacts, the plane of relative movement between said contacts being substantially perpendicular to the direction in which change of shape of said thermostatic member takes place, and means for effecting relative movement between said contacts on change of shape of said thermostatic member.

16. Temperature controlled apparatus comprising a thermostatic member adapted to change shape upon variation in temperature, relatively movable contacts, the plane of relative movement between said contacts being substantially perpendicular to the direction in which change of shape of said thermostatic member takes place, and means for effecting relative movement between said contacts on change of shape of said thermostatic member including means for causing said relative movement to take place at a higher rate than the rate of movement of said thermostatic member during its change of shape.

17. A thermostatically controlled system, comprising a bimetallic member, having two positions of stable equilibrium with an intermediate position of unstable equilibrium, means remote from said member comprising at least two contacts adapted to effect a series of substantially simultaneous breaks in said circuit, and means for transmitting an impulse from said member to said remote means upon a change of position of said member.

18. A thermostatically controlled system, comprising a bimetallic member, having two positions of stable equilibrium with an intermediate position of unstable equilibrium, means remote from said member, and means for transmitting an impulse, accompanying the change of position of said member, from said member to said remote means, said second means, being adapted to change the direction of the impulse.

19. A thermostatically controlled system, comprising a bimetallic member, having two positions of stable equilibrium with an intermediate position of unstable equilibrium, series contact means remote from said member, and means mechanically connecting said member and said means for transmitting an impulse accompanying the change of position of said member.

20. A thermostatically controlled system, comprising a bimetallic member, having two positions of stable equilibrium with an intermediate position of unstable equilibrium, means remote from said member comprising at least two contacts adapted to effect a series of substantially simultaneous electrical breaks, and means mechanically connecting said member and said means for transmitting to said remote means and multiplying an impulse accompanying the change of position of said member, said connecting means comprising an elongated body.

21. A thermostatically controlled system, comprising a bimetallic member, having two positions of stable equilibrium with an intermediate position of unstable equilibrium, means remote from said member adapted to be operated by mechanical impulse, and means for transmitting an impulse, accompanying the change of position of said member, from said member to said remote means, said means adapted to transform substantially rectilinear motion into rotary motion.

22. A thermostatically controlled system, comprising a bimetallic member, having two positions of stable equilibrium with an intermediate position of unstable equilibrium, a device separated from said member adapted to be operated by mechanical impulse, and means for transmitting an impulse, accompanying the change of position of said member, from said member to said device, said means being rotatable with respect to said member.

23. A thermostatically controlled system, comprising a bimetallic member, having two positions of stable equilibrium with an intermediate position of unstable equilibrium, a device separated from said member adapted to be operated by mechanical impulse, and means for transmitting an impulse, accompanying the change of position of said member, from said member to said device, said means having a cam surface for imparting motion to said device.

24. A thermostatically controlled system, comprising a bimetallic member, having two positions of stable equilibrium with an intermediate position of unstable equilibrium, a device separated from said member adapted to be operated by mechanical impulse, and means for transmitting an impulse, accompanying the change of position of said member, from said member to said device, said means comprising an elongated member having a cam surface, and a member cooperating with said cam surface for imparting motion to said device.

25. A thermostatically controlled switch, comprising a bimetallic member, having two positions of stable equilibrium with an intermediate position of unstable equilibrium, a series-break, electrical switching device remote from said member, and means for transmitting the impulse accompanying the change of position of said member to said electrical device for causing the operation thereof.

26. A thermostatically controlled system, comprising a bimetallic member, having two positions of stable equilibrium with an intermediate position of unstable equilibrium, a device separated from said member adapted to be operated by mechanical impulse, and means for transmitting an impulse, accompanying the change of position of said member, from said member to said remote means, said means comprising cooperating parts which engage each other on a screw surface to cause the operation of said device.

27. A thermostatically controlled switch, comprising a bimetallic member, having two positions of stable equilibrium with an intermediate position of unstable equilibrium, a switch separate from said member and power transmitting means connecting said member and switch, said means comprising a slotted member and a relatively stationary member.

28. A thermostatic device, comprising a bent bimetallic member, adapted to change abruptly from one predetermined position to another due to temperature variations, means for supporting said member, and means for changing the range of temperature variations between which said member changes position.

29. A thermostatic device, comprising a bent bimetallic member, adapted to change abruptly from one position to another due to temperature variations, and adjustable supporting means for changing the range of temperature variations between which said member changes position.

30. A thermostatic device, comprising a bent bimetallic member, adapted to change abruptly from one position to another due to temperature variations, electrical switching means opened and closed by said changes in said member, supporting means for said member, and means for changing the range of temperature variations between which said member changes position.

31. The device of claim 29, with series-break switching means operated by the changes in said member.

32. A thermostatic device comprising a bent bimetallic member, adapted to change abruptly from one position to another due to temperature variations, means disposed edgewise of said member for supporting it, the entire member lying within the range between its supported edges, and means for changing the critical temperatures between which said member changes position.

33. A thermostatic device comprising a bent bimetallic member adapted to change abruptly from one position to another due to temperature variations, means for supporting said member at the edges of said bent portion, the entire member lying within the range between its supported edges, and means for changing the critical temperatures between which said member changes position.

34. A thermostatic device comprising a bent bimetallic member adapted to change abruptly from one position to another due to temperature variations, means for supporting said member, and means acting on the center of said bent portion for changing the range of temperature variations between which said member changes position.

35. A thermostatically controlled device, comprising a bimetallic member, having two positions of stable equilibrium and an intermediate position of unstable equilibrium, said member going from one position to another in response to temperature variations, and means for adjustably determining the temperature at either position for causing said member to change position.

36. A thermostatically controlled device, comprising a bent bimetallic member, having two positions of stable equilibrium with an intermediate position of unstable equilibrium, said member being flexed in both stable positions and means for varying the flexure of said member in either one of said stable positions by manipulation from either of two points.

37. A thermostatically controlled device, comprising a bimetallic member, having two positions of stable equilibrium with an intermediate position of unstable equilibrium, a device separated from said member adapted to be operated mechanical impulse, means for transmitting an impulse, accompanying the change of position of said member, from said member to said device, and means acting on said transmitting means to limit the extent of said impulse.

38. A thermostatically controlled device, comprising a bimetallic member, having two positions of stable equilibrium with an intermediate position of unstable equilibrium, a device separated from said member adapted to be operated by mechanical impulse, means connecting said member and device for transmitting an impulse accompanying the change of position of said member, and adjustable means cooperating with said connecting means to determine the critical temperatures at which said member changes position.

39. A thermostatic device, comprising a bimetallic member, having two positions of stable equilibrium with an intermediate position of unstable equilibrium, means for supporting an edge of said member, a device separate from said member adapted to be operated by mechanical impulse, and means connecting said device with a region of relatively great mobility on said member for transmitting the impulse accompanying the change in position of said member.

40. A thermostatic device, comprising a bimetallic member having a non-developable surface, and having two positions of stable equilibrium with an intermediate position of unstable equilibrium, means for confining the boundary of said surface, electrical contact making and breaking means remote from said member, and means connecting said contact making and breaking means with the central portion of said member for operating the same.

41. The device of claim 40 wherein said connecting means transforms linear motion into rotary motion.

42. A thermostatic switch, comprising a bimetallic member, having two positions of stable equilibrium with an intermediate position of unstable equilibrium, stationary and movable contacts adapted to be connected and disconnected, means mounting said member and stationary contacts, and means connecting said member and movable contacts for transmitting operative impulses thereto.

43. A thermostatic device, comprising a bimetallic member, having two positions of stable equilibrium with an intermediate position of unstable equilibrium, stationary and movable contacts adapted to be connected and disconnected to effect a series-break, means mounting said member and stationary contacts and means connecting said member and movable contacts, said connecting means and mounting means cooperating to cause the transmission of operative impulses from said member to said movable contacts.

44. The structure of claim 43 with adjustable means acting between said mounting means and said connecting means for determining the critical temperatures at which said bimetallic member changes position.

45. A thermostatic device comprising a cup shaped member, a bimetallic member having two positions of stable equilibrium with an intermediate position of unstable equilibrium, said bimetallic member closing the open end of said cup shaped member, stationary contacts carried by said cup shaped member, and an elongated body carrying movable contacts and having operative connection with said bimetallic member.

46. A self contained thermostatic switch comprising a cup shaped mounting member, a bimetallic member having two positions of stable equilibrium with an intermediate position of unstable equilibrium, said bimetallic member closing the open end of said mounting member, stationary contacts carried by said mounting member interiorly thereof, movable contacts cooperating with said stationary contacts within said mounting member, and means within said mounting member for transmitting operative impulses from said bimetallic member to said movable contacts.

47. The structure of claim 46, with adjustable means for determining the range of temperature variations between which said bimetallic member changes position.

48. A thermostatic device comprising a cup shaped supporting member, a bimetallic member mounted across the open end of said mounting member, said bimetallic member having two positions of stable equilibrium with an intermediate position of unstable equilibrium, means remote from said bimetallic member, and means for transmitting an impulse from said member to said remote means upon a change of position of said member.

49. The structure of claim 48 wherein said last named transmitting means is adapted to change the direction of the impulse.

50. The structure of claim 48 wherein said last named transmitting means comprises an elongated body.

51. The structure of claim 48 wherein the range of temperature variations between which said bimetallic member changes positions is adjustable.

52. Temperature controlling apparatus comprising a thermostatic member adapted to change shape suddenly in response to changes in temperature over predetermined limits, and means for varying both critical temperatures at which said thermostatic member will respond by change in its shape.

53. Temperature controlling apparatus comprising a thermostatic member comprising a sheet constructed and arranged when in the apparatus to change shape abruptly upon change of temperature, over predetermined limits, and means for varying both critical temperatures at which said thermostatic member will respond to change its shape, a switch, stationary contacts therefor, a cross-arm comprising movable contacts, a member carrying the arm but insulated from said movable contacts, and means functionally connecting the arm and the thermostatic element.

54. Temperature controlling apparatus comprising a thermostatic member adapted to change shape abruptly upon change of temperature, plural means for increasing and decreasing the actuating forces of the thermostatic member, a switch, a contact arm for the switch, means connecting the thermostatic member with said arm whereby the former actuates the latter, and means insulating the arm from the thermostatic member.

55. A thermostatic device comprising a sheet constructed and arranged to change shape abruptly upon predetermined change of temperature, and stop members limiting the movement of said sheet, whereby the critical temperatures between which the sheet will abruptly change shape, are varied.

56. A thermostatic device comprising a sheet constructed and arranged to change shape abruptly upon predetermined change of temperature, and means comprising adjustable stop members limiting the movement of said sheet whereby the critical temperatures between which the sheet will abruptly change shape, are varied.

57. A thermostatic device comprising a member cupped to change shape abruptly in response to temperature changes, and adjustable means for applying a variable external force to said member thereby to adjust its operative temperature range.

58. Temperature controlled apparatus comprising a thermostatic member adapted to change shape upon variation in temperature, an operating member connected to move therewith, a movable contact joined to said operating member, a fixed contact cooperating therewith and means associated with said operating member and movable contacts for moving the latter in a plane which is perpendicular to the movement of the operating member, and also moving said latter member in a direction parallel with the movement of said operating member, and at a rate higher than the rate of movement of said thermostatic member.

JOHN A. SPENCER.